United States Patent
Kennedy

(10) Patent No.: US 10,677,362 B2
(45) Date of Patent: Jun. 9, 2020

(54) SOLID WEDGE DISK VALVE WITH CARTRIDGE-CARRIAGE

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

(*) Notice: Subject to any disclaimer, the term of this patent is extended or adjusted under 35 U.S.C. 154(b) by 60 days.

(21) Appl. No.: 15/935,179

(22) Filed: Mar. 26, 2018

(65) Prior Publication Data

US 2019/0293188 A1    Sep. 26, 2019

(51) Int. Cl.
F16K 3/30    (2006.01)
F16K 3/12    (2006.01)
F16K 3/02    (2006.01)

(52) U.S. Cl.
CPC .............. *F16K 3/30* (2013.01); *F16K 3/0281* (2013.01); *F16K 3/12* (2013.01)

(58) Field of Classification Search
CPC ............. F16K 3/30; F16K 3/12; F16K 3/0281
See application file for complete search history.

(56) References Cited

U.S. PATENT DOCUMENTS

| | | | | |
|---|---|---|---|---|
| 1,534,513 | A * | 4/1925 | Fulton | F16K 3/184 251/197 |
| 1,933,182 | A * | 10/1933 | Pagon et al. | F16K 3/10 138/94.5 |
| 3,027,135 | A * | 3/1962 | Kellar | F16K 3/184 251/199 |
| 6,663,079 | B1 * | 12/2003 | Bottenfield | F16K 3/12 251/326 |
| 2018/0195623 | A1 * | 7/2018 | Geiser et al. | F16K 3/14 |

* cited by examiner

*Primary Examiner* — Kevin L Lee
(74) *Attorney, Agent, or Firm* — Brown & Michaels, PC

(57) ABSTRACT

A gate valve includes a solid wedge-shaped disc integrated with a cartridge at opposite ends thereof. Each cartridge includes rollers, guides and scrapers therein to roll along respective internal ribs while cleaning the ribs. The disc moves back and forth within the gate valve via the cartridges along ribs to open and close a water passage way formed in the gate.

17 Claims, 7 Drawing Sheets

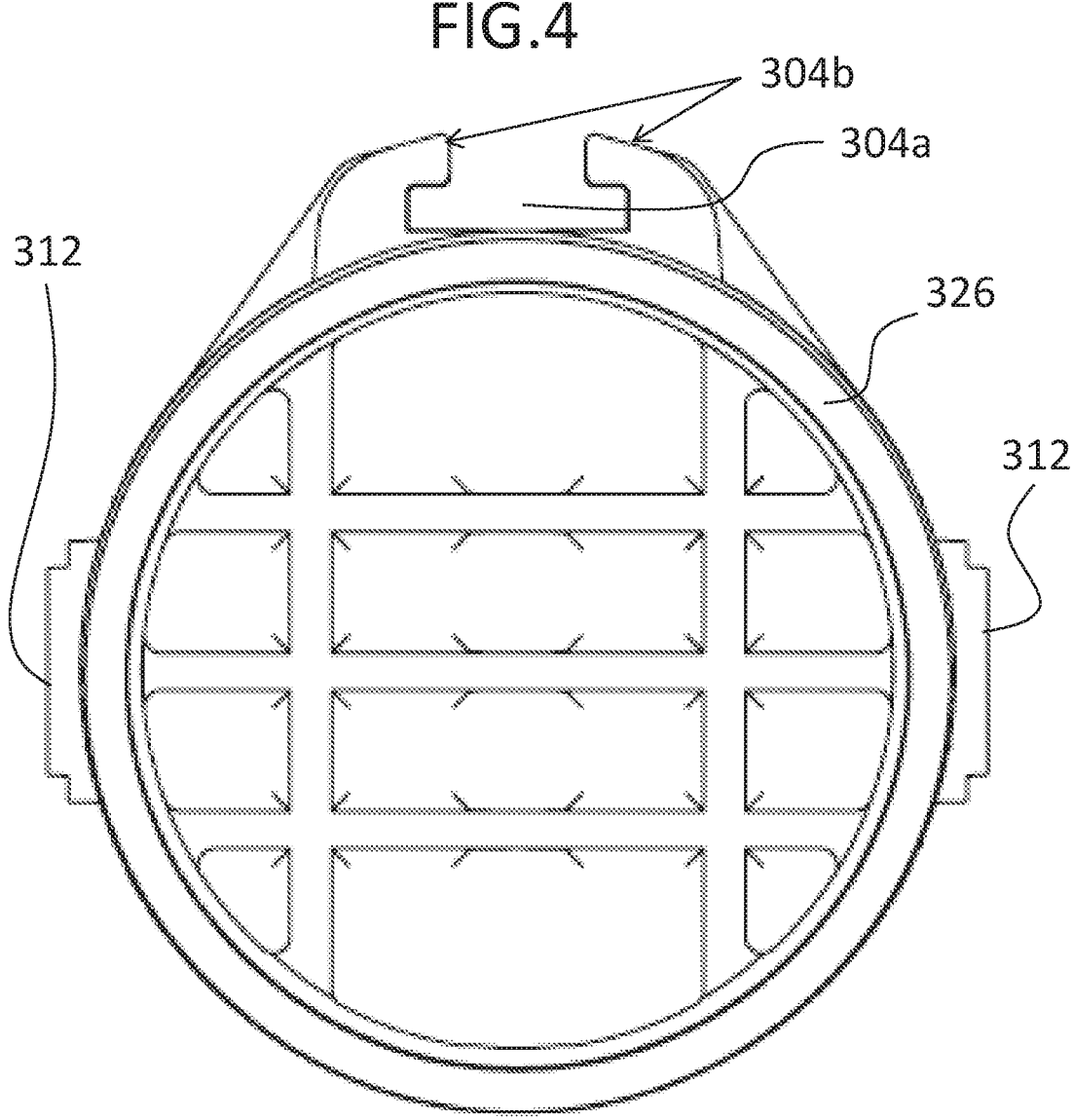
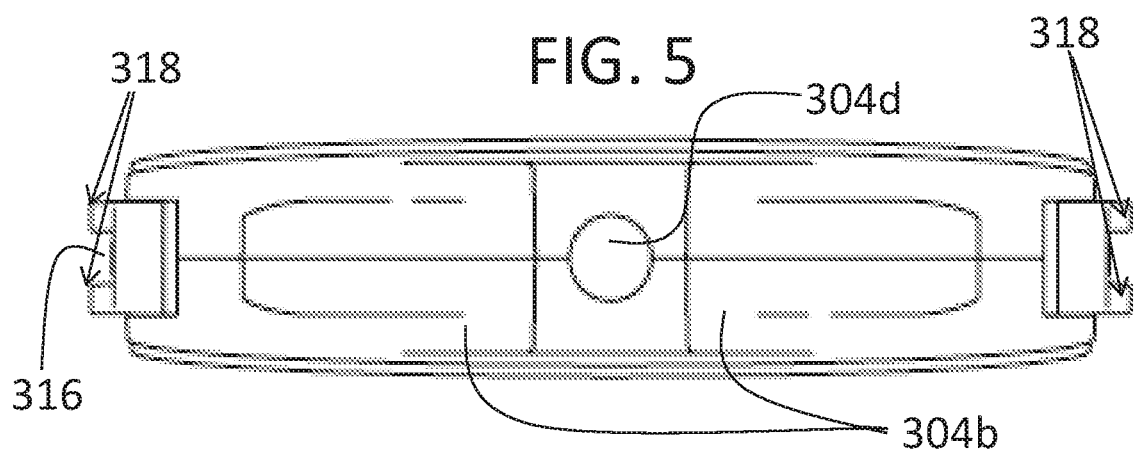

SOLID WEDGE DISK VALVE WITH CARTRIDGE-CARRIAGE

FIELD OF THE INVENTION

The invention pertains to the field of solid wedge-shaped disc gate valves. More particularly, the invention pertains to solid wedge gate valves with a cartridge-carriage assembly to improve the opening and closing of the solid wedge disc within the valve.

DESCRIPTION OF RELATED ART

Large scale gate water valves have been used for centuries for water supply services and to control the flow of water through pipes. Such valves have been known to accumulate debris and sediment buildup within the valves, resulting in time consuming and costly valve removal or repair. As a result large double disc technologies of decades past have used various methods to clear the line of debris and sediment buildup prior to closing the valves. Recent technology has replaced the double disc valves with a solid wedge including a scraper technology to clean off the debris and sediment buildup as the valve closes and opens.

One such solid wedge gate valve including the scraper technology is illustrated in FIG. 1. FIG. 1 illustrates a large scale solid wedge gate valve 100 having a body 102 including water flow ports 102a (an identical second flow port is not visible, but is opposite the illustrated flow port 102a). Within the body 102 and covering the flow ports 102a are rotatable discs 104 and a solid wedge 106 including an upper wedge 106a and a lower wedge 106b. The disc 104 seals the flow ports 102a with the aid of body seat rings 110. The wedge 106 includes a pair of scrapers 108 connected to opposite sides of the wedge 106. These scrapers 108 move up and down along tracks 112 via small rollers 114 adjacent to the scrapers 108 in order to prevent debris and sediment buildup along the tracks 112 when the valve 100 is opening to allow water to flow through the ports 102a and when the valve 100 is closing to block water from flowing through the ports 102a. The wedge 106 is moved by an operating stem (not illustrated) which is threaded into an upper wedge bushing 106a1.

Another solid wedge gate valve that uses the scraper technology is illustrated in FIG. 2. FIG. 2 illustrates a large scale solid wedge gate valve 200 including a body 202 with water flow ports 202a. Within the body 202 is a solid wedge 204 including scrapers 206 connected to opposite sides of the wedge 204 at scraper mount extrusions 208. These scrapers 206 move up and down along tracks 210 formed within sides of the body 202. Each scraper 206 includes two rollers 212 formed along the length thereof and are embedded within the scrapers 206. The rollers 212 are held within the scrapers 208 by roller pins 216.

SUMMARY OF THE INVENTION

The foregoing and other aspects according to an exemplary embodiment of the general inventive concept provide a gate valve including: a body including: two ports disposed at opposite sides thereof; and two ribs protruding from internal sides of the body toward each other and extending lengthwise of the body; a wedge shaped disc movably disposed within the body and including a roller assembly disposed at opposite sides thereof including rollers configured to roll along respective ribs such that the disc opens the ports and closes the ports.

In an exemplary embodiment, the roller assembly may include: a cartridge-carrier assembly extending lengthwise in parallel with a respective rib and including a hollow interior containing the rollers therein and a scraper disposed between lengthwise ends thereof to scrape the rib as the disc is moved.

In another exemplary embodiment, the cartridge-carriage may further a guide extending from and along each of opposite lengthwise sides thereof and covering a respective side of the rib.

In another exemplary embodiment, the scrapers and guides can be formed integrally with the cartridge-carriage assembly.

In another exemplary embodiment, the disc can include a groove formed into each side such that each cartridge-carriage assembly sits within the respective groove.

In yet another exemplary embodiment, the gate valve can further include: an operating stem that extends into a lengthwise end thereof and is threaded into a top of the disc such that when the operating stem is turned clockwise and counterclockwise the disc moves up and down, respectively, along the ribs.

In still another exemplary embodiment, the gate valve can further include: a track folded over each rib to cover the exposed sides and top of each rib such that the rollers roll on the respective track while the guides extend adjacent to the track.

The foregoing and other aspects according to an exemplary embodiment of the general inventive concept provide a gate valve assembly, including: a body including an upper portion and a lower portion connected together and including a pair of ribs therein extending inwardly away from the body and lengthwise between the upper and lower portions of the body to face each other, the lower portion having a pair of ports extending therethrough and facing each other to form an opening through the body; a wedge-shaped disc disposed therein to move between the upper portion and the lower portion of the body to open and close both ports simultaneously; and a cartridge-carriage formed within opposite sides of the disc and including at least two rollers configured to roll along a respective one of the ribs.

In an exemplary embodiment, the cartridge-carriage can further include a hollow interior with two lengthwise sides and two widthwise sides, the rollers being disposed within the hollow interior, the lengthwise sides each including a guide protruding outward and the widthwise sides each including a scraper integrally formed therein such that the guides extend over respective sides of the rib and the scrapers extend across the face of the rib.

In another exemplary embodiment, the gate valve assembly can further include a track formed over the length of each rib such that the rollers roll on the tracks and the guides glide adjacent to the tracks.

In another exemplary embodiment, the tracks can be formed of either stainless steel or bronze.

In another exemplary embodiment, the gate valve assembly can further include: a threaded operating stem extending through the top of the body and threaded through a top of the disc such that turning the stem moves the between the upper portion and lower portion of the body along the ribs.

In yet another exemplary embodiment, the disc can include a groove formed along each side thereof in which a respective cartridge is seated therein.

In still another exemplary embodiment, the cartridges can be secured within the respective groove of the disc with screws.

The foregoing and other aspects according to an exemplary embodiment of the general inventive concept provide a gate valve assembly, including: a body having a long tubular shape including ports extending through opposite sides thereof at one end to form a water flow path therethrough and a rib extending between each of the ports along the lengthwise direction; a wedge shaped disc disposed within the body and integrally formed with: a pair of rollers disposed in sequence within a perimeter of and along each side of the disc to roll along a respective rib; guides protruding from and extending along each side of the disc and adjacent to a respective side of each rib; and scrapers extending in parallel with the rollers and configured to scrape the respective rib while the rollers roll along the respective rib.

In an exemplary embodiment, the gate valve assembly can further include: a cartridge integrally formed at each side of the disc and within the perimeter of the disc, each cartridge being integrally formed with the guides and scrapers and including the rollers disposed within a hollow portion therein.

In another exemplary embodiment, gate valve assembly can further include: a track formed over each rib such that the respective rollers roll along the track and the respective guides glide adjacent to the track while the respective scrapers scrape a portion of the track where the rollers contact the track.

In still another exemplary embodiment, the rollers within each cartridge can be disposed between the pair of scrapers such that when the disc moves along the ribs the scrapers scrape parts of the track prior to the rollers rolling over said portions of the track In still another exemplary embodiment, the gate valve assembly can further include: a threaded operating stem extending through a top portion of the body and threaded into a top portion of the disc such that rotation of the stem moves the disc back and forth along the ribs to open and close the water flow path.

In yet another exemplary embodiment, the disc can include sealing rings disposed around the perimeter of each side thereof to seal a respective port.

BRIEF DESCRIPTION OF THE DRAWING

FIG. 4 shows a front external side of the solid wedge disc of FIG. 3;

FIG. 5 shows a top view of the solid wedge disc of FIG. 4;

DETAILED DESCRIPTION OF THE INVENTION

Figure 1:
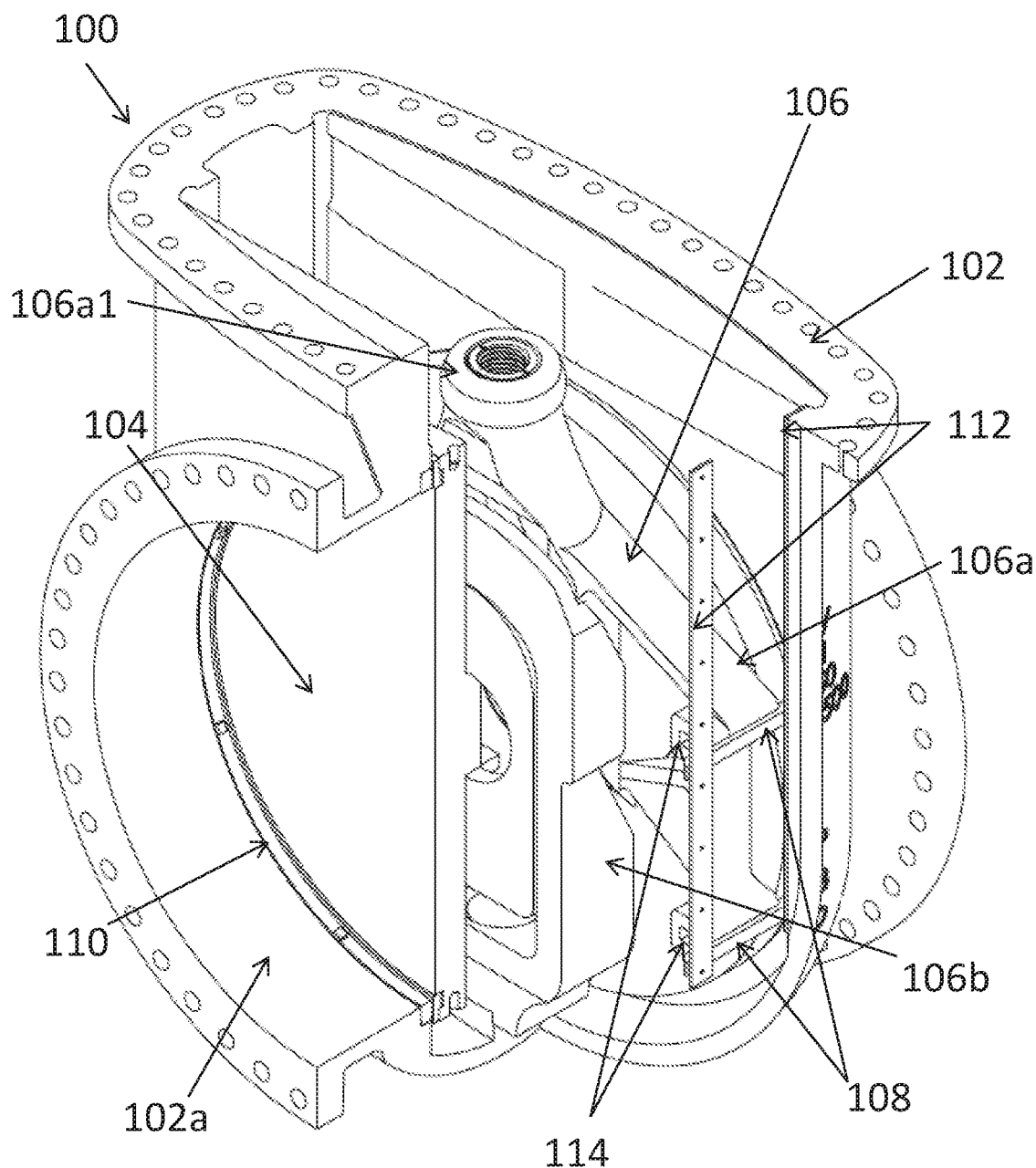
FIG. 1 shows a conventional solid wedge gate valve with rotatable discs.
Figure 2:
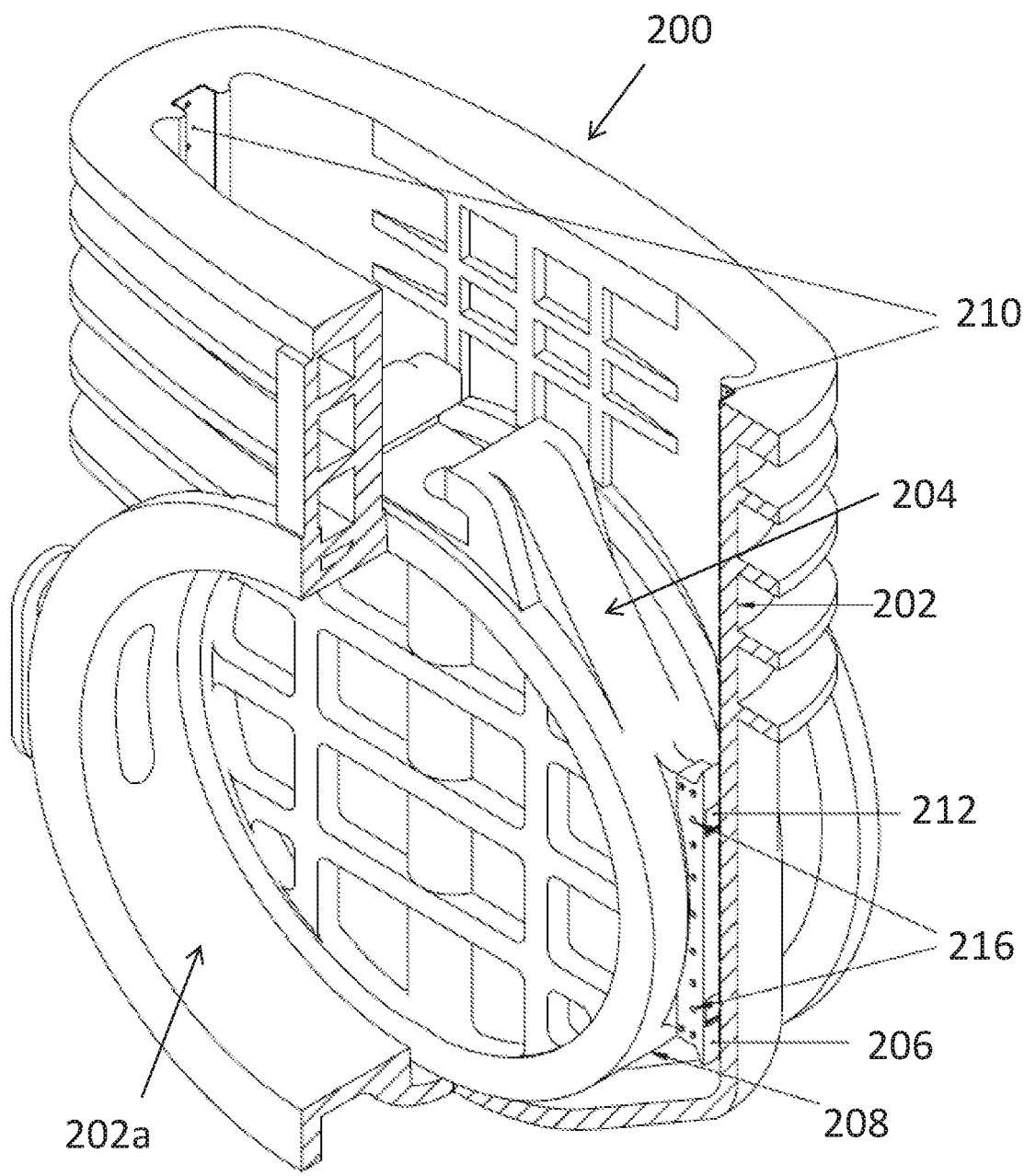
FIG. 2 shows another conventional solid wedge gate valve.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As discussed above, this disclosure pertains to solid wedge-shaped disc gate valves, and more particularly, to solid wedge gate valves with a cartridge-carriage assembly that improves the opening and closing of the solid wedge-shaped disc within a gate valve.

Figure 3:
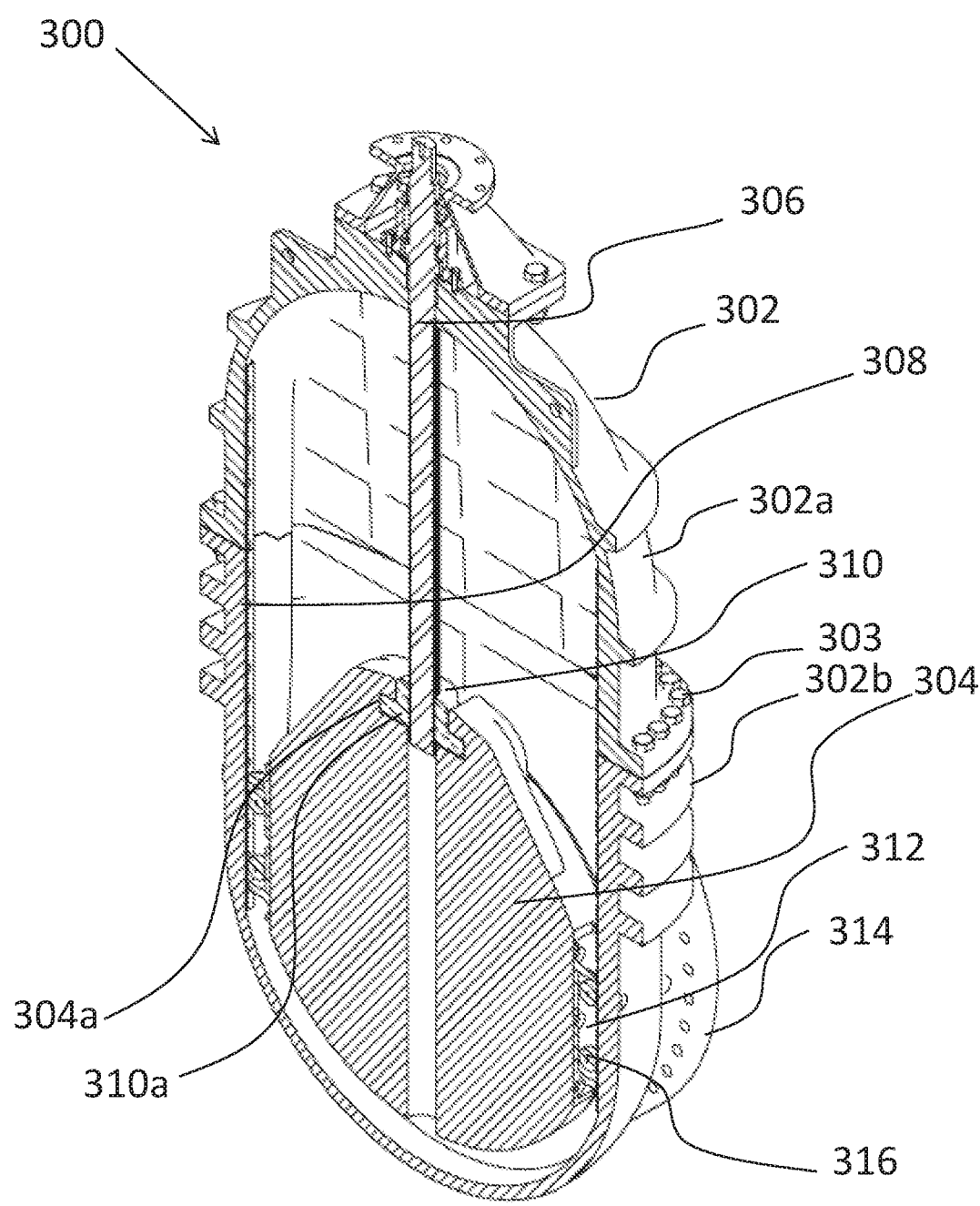
FIG. 3 shows a cross-sectional view of an internal portion of a gate valve including a cross-sectional view of a solid wedge disc, according to an embodiment of the inventive concept.

FIG. 3 shows a cross-sectional view of a gate valve assembly 300 according to an embodiment of the general inventive concept. The gate valve assembly 300 of FIG. 3 includes a body 302 formed of cast iron. However, it is to be noted that the gate valve body 302 can be formed of alternative materials which will perform the intended purposes of a gate valve assembly as described herein.

The body 302 can be formed of an upper section 302a and a lower section 302b. The lower section includes a pair of identical ports 314 in axial alignment and at opposite sides of the lower section 302b in which water or other fluids can flow through when both ports 314 are not blocked. The upper section 302a and the lower section 302b of the gate valve assembly 300 can be connected together by bolts 303 or other types of connectors which will maintain a tight connection between the upper and lower sections 302a, 302b as required in order to perform the intended purposes of the gate valve assembly 300 as described herein. As illustrated in FIG. 3, a solid wedge-shaped disc 304 is movably disposed within the bottom section 302b of the body 302. The disc 304 is connected to an operating stem 306 via an operating stem bushing 310 that is seated within a grooved section 304a of the disc 304. FIG. 3 illustrates only a cross-sectional view of the disc 304 to illustrate the placement and operations of the operating stem bushing 310 and operating stem 306 with respect to the disc 304. When the disc 304 is moved from the lower portion 302b to the upper section 302a, as will be explained in more detail below, the aligned ports 314 become unblocked to create a water flow path therethrough.

The operating stem bushing 310 includes a threaded hole 310a extending therethrough to receive the operating stem 306. The operating stem 306 is threaded along its length such that it can be threaded through the hole 310a of the operating stem bushing 310 to connect with and move the disc 304 back and forth between the upper and lower section 302a, 302b of the body 302. When the operating stem 306 is accessed through an opening at a top of the upper section 302a of the gate valve assembly 300, rotation of the operating stem 306 will move the disc 304 up and down within the body 302 while the disc 304 remains in sliding contact with ribs 308 extending along a length of opposite sides of the inside of the body 302. The disc 304 includes a cartridge-carriage 312 connected at first and second sides thereof, respectively. These cartridge-carriages 312 move along respective ones of the ribs 308 with the aid of rollers 316 to be described in more detail below.

When the operating stem 306 is rotated in one direction to move the disc 304 from the lower second 302b to the upper section 302a of the body 302 along the ribs 308, the ports 314 in the lower section 302b of the body 302 become exposed such that the gate valve 300 becomes in an opened state to create a water flow path therethrough. The ports 314 are in axial alignment and when the ports are opening as a result of the disc 304 being moved toward the upper body section 302a from the lower body section 302b, water can be received through one of the ports 314, from which it can continue to flow through the other port 314.

FIG. 4 illustrates a front view of the disc 304 with a cartridge-carrier 312 disposed at each side thereof. Also illustrated is a front view of the groove 304a formed at the top of the disc 304, which receives the operating stem connector 310 therein. The groove 304a is formed by a pair of ears 304b which extend away from the disc 304 and then toward each other, thus forming the groove 304a, which holds the operating stem bushing 310 therein. Around the outer perimeter of each side of the disc 304 are sealing rings 326 to seal the respective ports 314 when the disc 304 is moved into the lower section 302b of the body 302 to block the ports 314. The wedge shape of the disc 304 improves the sealing of the perimeter of the disc 304 to the inner perimeter of the respective port 314. The sealing rings 326 can be formed of bronze. Alternatively, the sealing rings 326 can be formed of any material that will form a tight seal between the disc 304 and the ports 314 while maintaining a long lifespan.

FIG. 5 illustrates a top view of the disc 304 including a top view of the pair of ears 304b extending toward each other. Both cartridge-carriers 312 are illustrated to have guides 318 which extend from the bottom of the cartridge-carriage 312 and along a respective side of the rib 308 to guide the disc 304 along the rib 308. The rollers 316 are almost completely hidden in FIG. 5 since the rollers 316 are embedded within a length-wise cut out section 312a (see FIGS. 6 and 8) of the cartridge-carriage 312. Also illustrated in FIG. 5 is a hole 304d formed at the top of the disc 304 in which the operating stem 306 extends through after being threaded through the operating stem bushing 310, which as described above, is fastened within the groove 304a of the disc 304.

Figure 6:
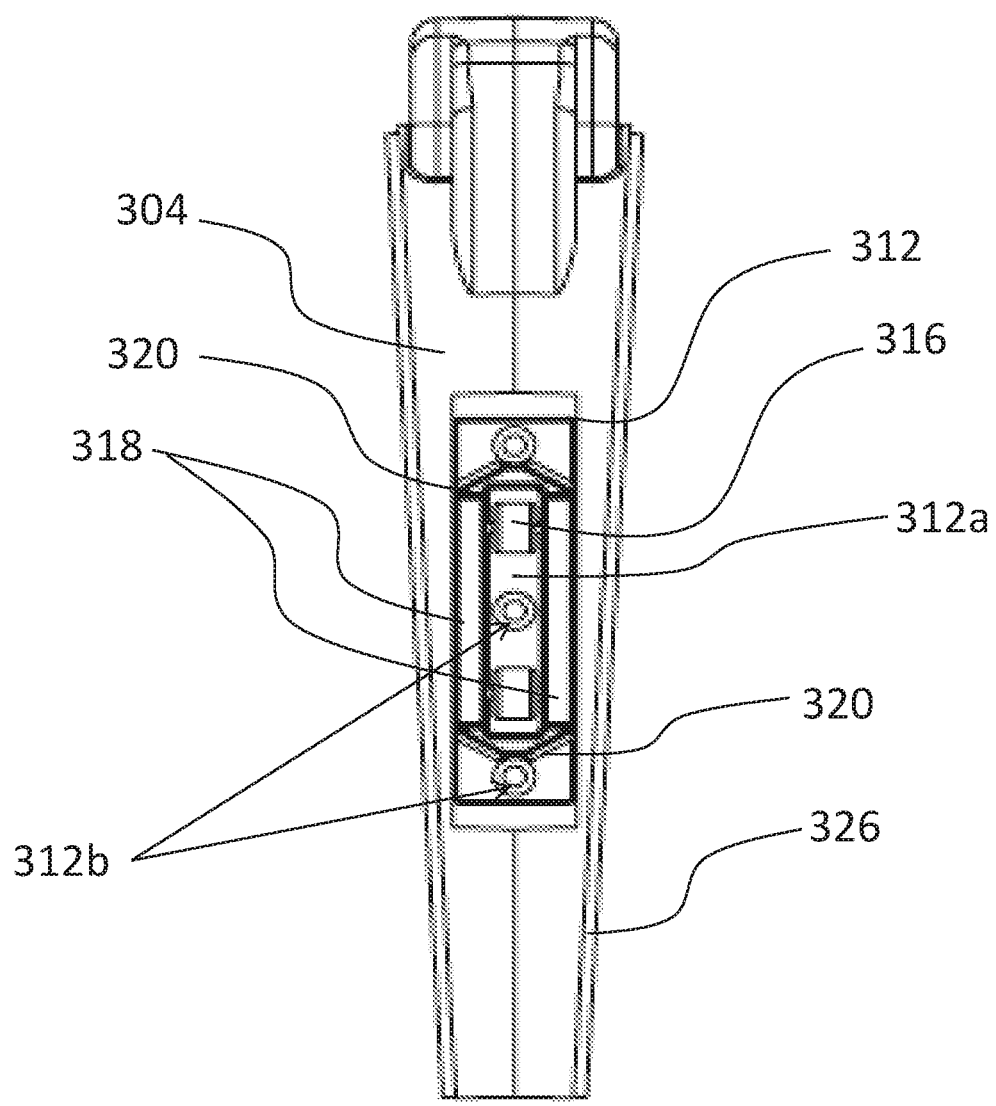
FIG. 6 shows a side view of the solid wedge disc of FIGS. 4 and 5, including a cartridge-carriage connected thereto, according to an embodiment of the inventive concept.

FIG. 6 illustrates a side view of both halves of the disc 304 illustrated in FIG. 3. From this view a bottom of the cartridge-carriage 312, which contacts and moves along the respective rib 308, is illustrated. The bottom of the cartridge-carriage 312 includes the two rollers 316 which roll along the rib 308 as the disc 304 is driven between the upper section 302a and the lower section 302b of the body 302. As illustrated in FIG. 6, the disc 304 can have a wedge shape, which tapers inward from the top to the bottom of the disc 304 in order to provide a tight seal between the disc 304 and the outer perimeter of each port 314 when the sealing rings 326 connect with the outer perimeters of the ports 314. This solid wedge shaped disc 304 no moving parts with respect to each other, which easier to manufacture. Further, the solid disc avoids having pockets between separate discs, which prevents buildup in the pockets, and therefore is more appropriate for use with sewage water.

Also illustrated in FIG. 6 is a pair of scrapers 320 formed toward each length-wise end of the cartridge-carriage 312. The scrapers 320 can be formed integrally with the body of the cartridge-carriage 312 to provide a strong integration between the scrapers 320 and the cartridge-carriage 312 such that the scrapers 320 can withstand any contact with solid debris and sediment build-up which can occur over a long period of time. The scrapers 320 can be formed to the same height as the rollers 316 or slightly higher than the rollers 316 so that the rollers 316 remain in contact with the rib 308. The rollers 316 are positioned between the pair of scrapers 320. The rollers 316 can each be positioned adjacent to a respective scraper 320 to provide a stable rolling contact between the cartridge-carriage 312 and the rib 308. The scrapers 320 can remove debris and sediment build-up as the cartridge-carriage 312 moves back and forth along the respective rib 308. The cartridge-carriage 312 can also include screw holes 312b formed through the top surface thereof which contacts the side of the disc 304, as will be illustrated and explained in more detail with reference to FIG. 8. Screw holes (not illustrated) will also be formed in the sides of the disc 304 to align with the screw holes 312b of the cartridge-carriage 312 such that screws can fasten the cartridge-carriage 312 securely to the side of the disc 304.

Figure 7:
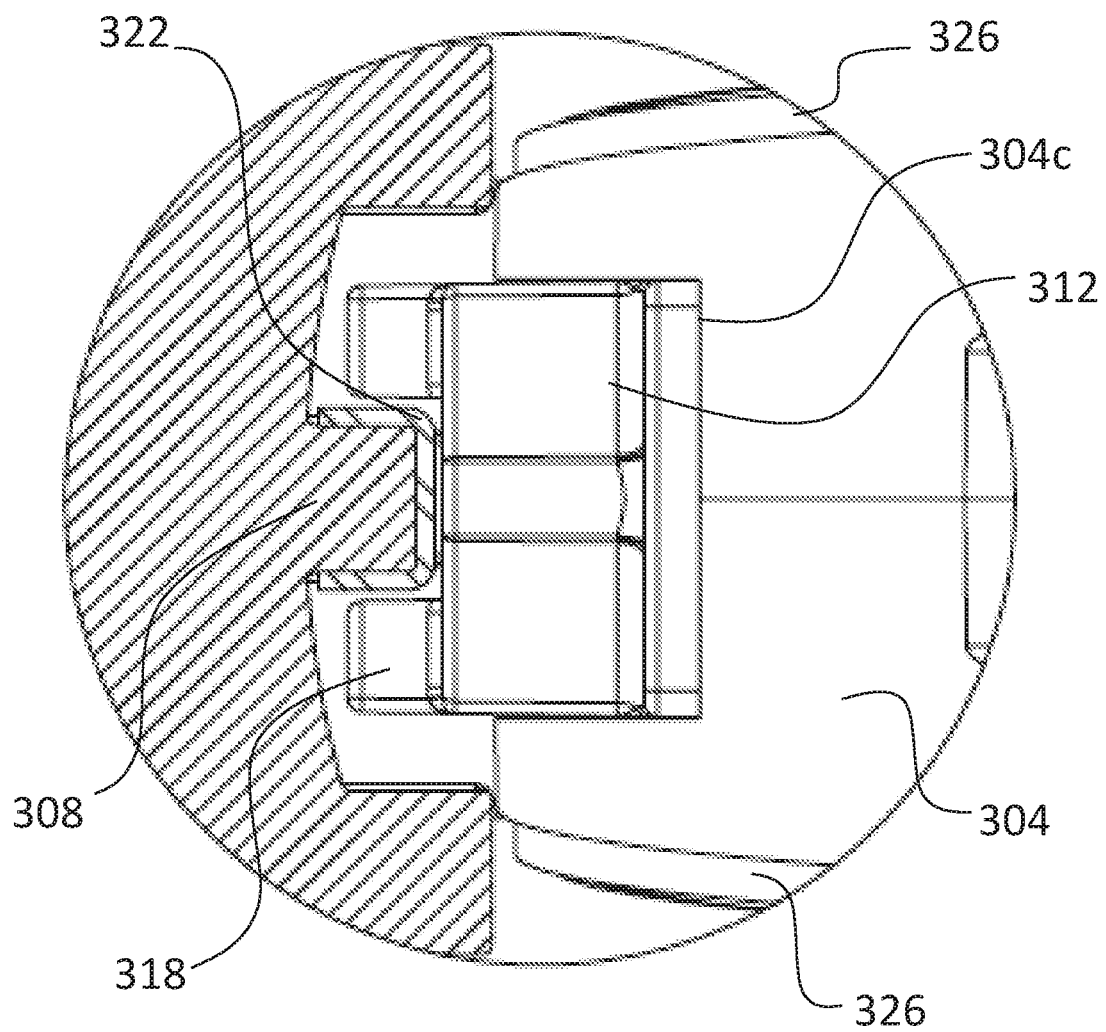
FIG. 7 shows a top view of the gate valve of FIG. 3 including the solid wedge disc slidably disposed therein.

FIG. 7 illustrates a top view (looking into the body 302 from the upper section 302a toward the lower section 302b) of the cartridge-carriage 312, the disc 304 and a rib 308 as the rib 308 extends outward from an internal wall of the body 302. As can be seen in FIG. 7, the disc 304 has a seat 304c formed through each side in which the cartridge-carriage 312 can be seated in and securely fastened. The seat 304c includes a bottom and two sides that provide additional support for the sides of the cartridge-carriage 312 in order to prevent the cartridge-carriage 312 from breaking loose of the disc 304 as well as helping prevent the screws 324 that connect the cartridge-carriage 312 and the disc 304 together from being exposed to the elements and deteriorating over time. As seen from the top view of the body 302 in FIG. 7, the elements cannot easily get between the cartridge-carriage 312 and the seat 304c of the disc 304 where the screws 324 are as a result of the sides of the seat 304c blocking access to the screws 324.

Still referring to FIG. 7, a track 322 that wraps around the three exposed sides of each rib 308 fully covers the rib 308. Thus the rollers 316 of the cartridge-carriage 312 ride along a face of the track 322 which covers a face of the rib 308 while the guides 318 glide adjacent to side portions of the track 322 which cover the respective two sides of the rib 308. The track 322 can be formed from stainless steel, bronze, or any other material that will perform the intended functions of the track 322 as described herein.

Figure 8:
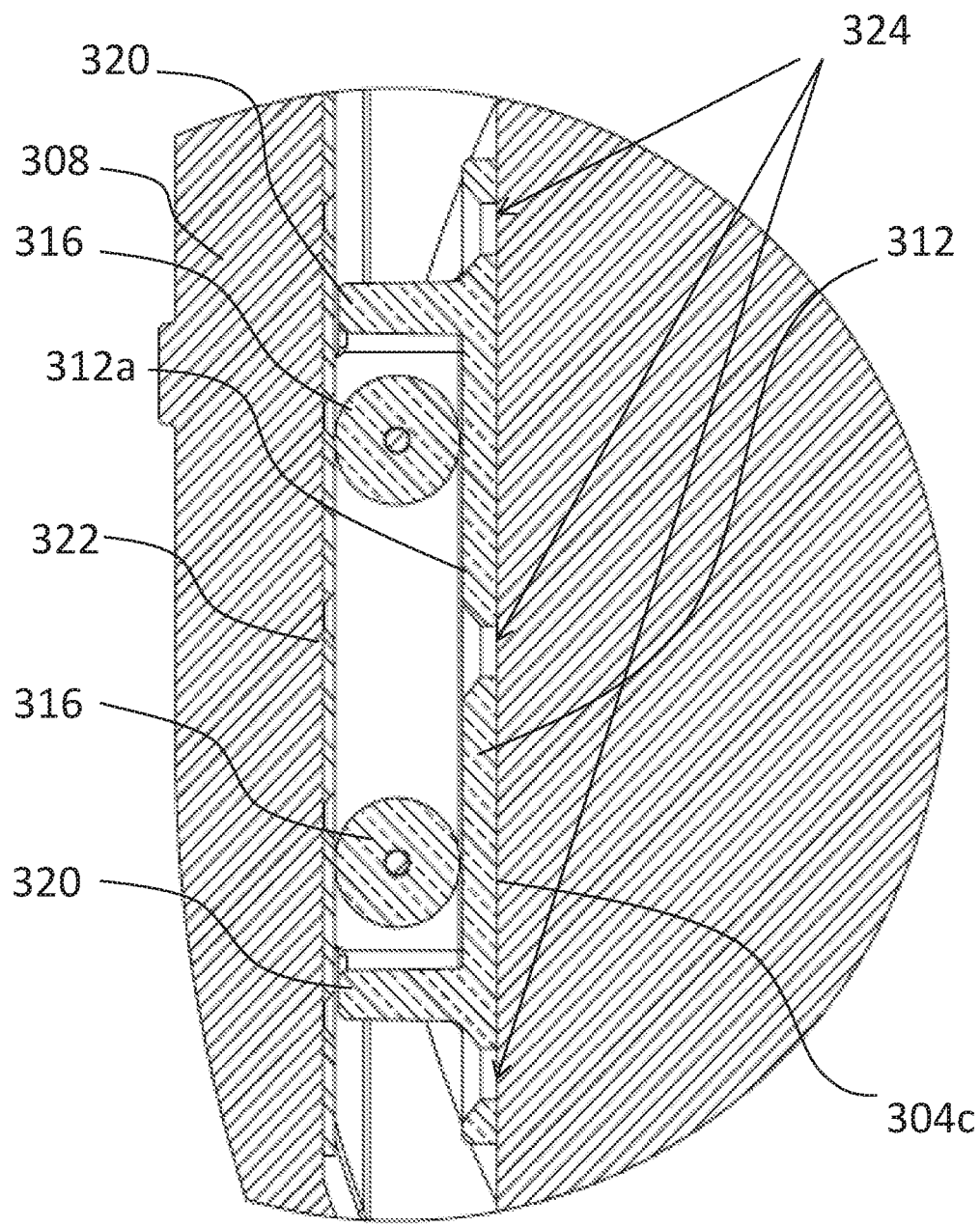
FIG. 8 shows a plan view of the solid wedge disc including the cartridge-carriage in operation within the gate valve, in accordance with the embodiment of FIGS. 3 and 7.

FIG. 8 illustrates a plan view of the cartridge-carrier 312 (guides 318 not illustrated) being connected within the seat 304c of the disc 304 via screws 324 as the cartridge-carriage 312 glides along the track 322 disposed over the face side of the rib 308. This plan view illustrates the rollers 316 rolling along the track 322 while the scrapers 320 glide adjacent to the track 322 to scrape off any debris or sediment buildup that can form on the track 322 over time due to the natural elements of the environment, etc.

Accordingly, it is to be understood that the embodiments of the inventive concept herein described are merely illustrative of the application of the principles of the invention. Reference herein to details of the illustrated embodiments is not intended to limit the scope of the claims, which themselves recite those features regarded as essential to the invention.

What is claimed is:

1. A gate valve comprising:
a body including: two ports disposed at opposite sides thereof; and two ribs protruding from internal sides of the body toward each other and extending lengthwise of the body;
a wedge shaped disc movably disposed within the body and including a roller assembly disposed at opposite sides thereof including rollers configured to roll along respective ribs such that the disc opens the ports and closes the ports; and
a cartridge-carrier assembly extending lengthwise in parallel with a respective rib and including a hollow interior containing the rollers therein and a scraper disposed between lengthwise ends thereof to scrape the rib as the disc is moved, wherein the cartridge-carriage further includes a guide extending from and along each of opposite lengthwise sides thereof and covering a respective side of the rib.

2. The gate valve of claim 1, wherein the scrapers and guides are formed integrally with the cartridge-carriage assembly.

3. The gate valve of claim 1, wherein the disc comprises a groove formed into each side such that each cartridge-carriage assembly sits within the respective groove.

4. The gate valve of claim 3, further comprising:
an operating stem that extends into a lengthwise end thereof and is threaded into a top of the disc such that when the operating stem is turned clockwise and counterclockwise the disc moves up and down, respectively, along the ribs.

5. The gate valve of claim 1, further comprising:
a track folded over each rib to cover the exposed sides and top of each rib such that the rollers roll on the respective track while the guides extend adjacent to the track.

6. A gate valve assembly, comprising:
a body including an upper portion and a lower portion connected together and including a pair of ribs therein extending inwardly away from the body and lengthwise between the upper and lower portions of the body to face each other, the lower portion having a pair of ports extending therethrough and facing each other to form an opening through the body;
a wedge-shaped disc disposed therein to move between the upper portion and the lower portion of the body to open and close both ports simultaneously; and
a cartridge-carriage formed within opposite sides of the disc and including at least two rollers configured to roll along a respective one of the ribs, wherein the cartridge-carriage further includes a hollow interior with two lengthwise sides and two widthwise sides, the rollers being disposed within the hollow interior, the lengthwise sides each including a guide protruding outward and the widthwise sides each including a scraper integrally formed therein such that the guides extend over respective sides of the rib and the scrapers extend across the face of the rib.

7. The gate valve assembly of claim 6, further comprising:
a track formed over the length of each rib such that the rollers roll on the tracks and the guides glide adjacent to the tracks.

8. The gate valve assembly of claim 7, wherein the tracks are formed of either stainless steel or bronze.

9. The gate valve assembly of claim 6, further comprising:
a threaded operating stem extending through the top of the body and threaded through a top of the disc such that turning the stem moves the disc between the upper portion and lower portion of the body along the ribs.

10. The gate valve assembly of claim 7, wherein the disc includes a groove formed along each side thereof in which a respective cartridge is seated therein.

11. The gate valve assembly of claim 10, wherein the cartridges are secured within the respective groove of the disc with screws.

12. A gate valve assembly, comprising:
a body having a tubular shape including ports extending through opposite sides thereof at one end to form a water flow path therethrough and a rib extending between each of the ports along the lengthwise direction;
a wedge shaped disc disposed within the body and integrally formed with:
a pair of rollers disposed in sequence within a perimeter of and along each side of the disc to roll along a respective rib;
guides protruding from and extending along each side of the disc and adjacent to a respective side of each rib; and
scrapers extending in parallel with the rollers and configured to scrape the respective rib while the rollers roll along the respective rib.

13. The gate valve assembly of claim 12, further comprising:
a cartridge integrally formed at each side of the disc and within the perimeter of the disc, each cartridge being integrally formed with the guides and scrapers and including the rollers disposed within a hollow portion therein.

14. The gate valve assembly of claim 13, further comprising:
   a track formed over each rib such that the respective rollers roll along the track and the respective guides glide adjacent to the track while the respective scrapers scrape a portion of the track where the rollers contact the track.

15. The gate valve assembly of claim 14, wherein the rollers within each cartridge are disposed between the pair of scrapers such that when the disc moves along the ribs the scrapers scrape parts of the track prior to the rollers rolling over said portions of the track.

16. The gate valve assembly of claim 12, further comprising:
   a threaded operating stem extending through a top portion of the body and threaded into a top portion of the disc such that rotation of the stem moves the disc back and forth along the ribs to open and close the water flow path.

17. The gate valve assembly of claim 16, wherein the disc include sealing rings disposed around the perimeter of each side thereof to seal a respective port.

\* \* \* \* \*